June 29, 1954 — J. D. BROWN — 2,682,078
MEAT TENDERIZER DRIVE MECHANISM
Original Filed Nov. 9, 1946 — 2 Sheets-Sheet 1
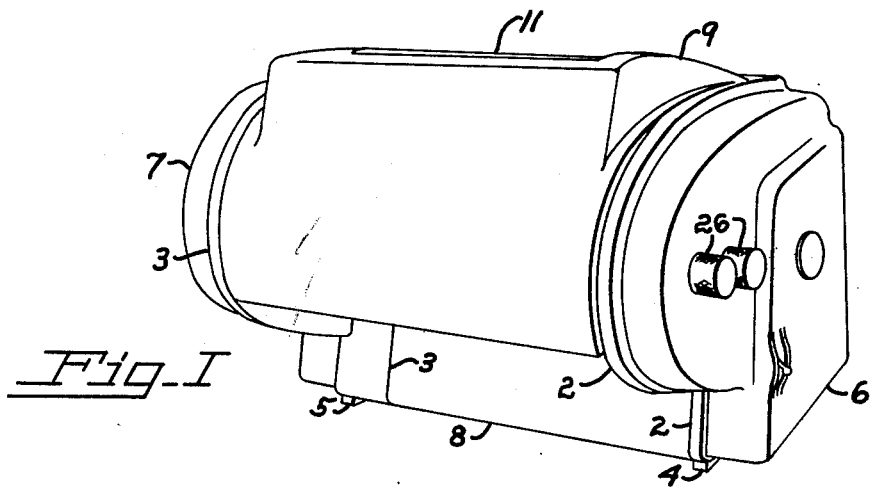
Fig. I
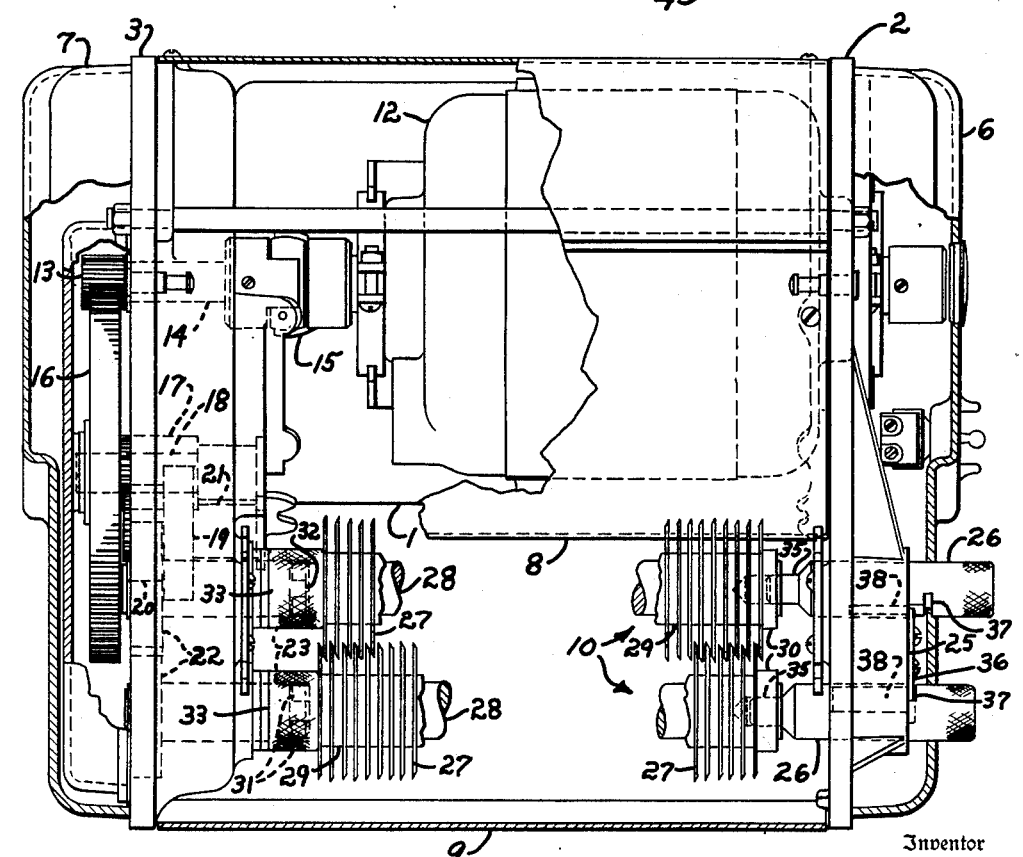
Fig. II
Inventor
JAMES D. BROWN
By Marshall & Marshall
Attorneys June 29, 1954 J. D. BROWN 2,682,078
MEAT TENDERIZER DRIVE MECHANISM
Original Filed Nov. 9, 1946 2 Sheets-Sheet 2
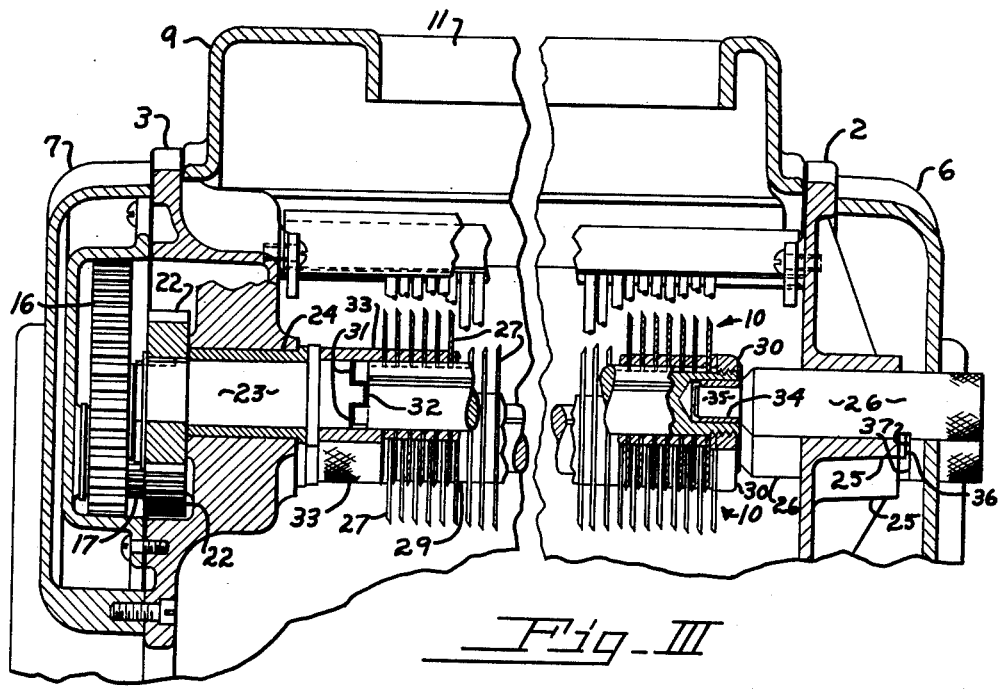
Fig. III
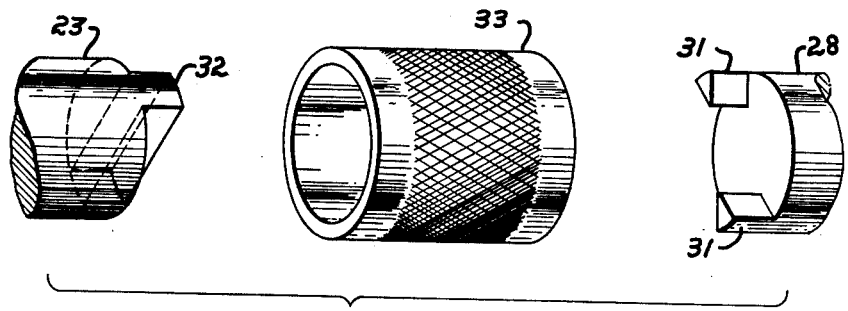
Fig. IV
Inventor
JAMES D. BROWN
By
Marshall and Marshall
Attorneys Patented June 29, 1954

2,682,078

UNITED STATES PATENT OFFICE 2,682,078

MEAT TENDERIZER DRIVE MECHANISM

James D. Brown, Toledo, Ohio, assignor to Toledo Scale Company, Toledo, Ohio, a corporation of New Jersey Original application November 9, 1946, Serial No. 708,834. Divided and this application December 7, 1951, Serial No. 260,453

3 Claims. (Cl. 17—26)

This invention relates to meat tenderizing machines and particularly to improved disengageable driving means for meat tenderizing rolls.

It is the principal object of this invention to provide in a meat tenderizing machine an improved disengageable drive for tenderizing rolls which permits easy removal of the rolls from the machine, and easy replacement of the rolls therein.

A more specific object is the provision of an improved type of disengageable drive means for meat tenderizing rolls which allows a great latitude of angular misalignment between the driving member and the driven member when the rolls are assembled in the machine.

A further object is to provide improved means which permit a simple installation of meat tenderizing rolls in a tenderizing machine and thereby reduce the possibility of injury to the operator.

Further objects and advantages will be apparent from the following description, in which reference is had to the accompanying drawings illustrating a preferred form of the machine embodying the invention.

According to the invention a pair of tenderizing roll shafts are each provided at one end with two substantially triangular projections which correspond with and are driven by tenon-like projections on the ends of a pair of drive arbors. A short collar or sleeve is fastened to each of the tenderizing roll shafts and extends beyond the spaced projections. When the rolls are operatively engaged with the drive arbors, the collars enclose the ends of the arbors and the tenons engage with the triangular projections on the shafts. The collars are reasonably closely fitted on the arbors to retain the arbors and tenderizing roll shafts in correct alignment when they are engaged.

In the drawings:

Figure I is a front perspective view of a tenderizing machine embodying the invention.

Figure II is an enlarged plan view of the machine shown in Figure I, certain parts being broken away and certain parts being shown in section.

Figure III is a fragmentary vertical sectional view of a machine embodying the invention.

Figure IV is an enlarged exploded view in perspective of the disengageable driving means employed in the invention.

Referring to the drawings, a meat tenderizing machine of the type fully shown and illustrated in my co-pending applications Serial Number 708,834 filed November 9, 1946, of which this a division, and Serial No. 700,813 filed October 2, 1946, both now abandoned, comprises a horizontal motor base 1 from the ends of which extend upright end frame members 2 and 3. The end frame members 2 and 3 each have a pair of integrally cast feet 4 and 5 respectively and a forwardly overhanging peripheral rim forming a portion of the exterior contour of the machine. A pair of end bells 6 and 7 are secured to the end frame members 2 and 3 and form the ends of the machine as seen in Figure I.

A motor housing 8 which in cross-section is in the shape of an inverted U, extends longitudinally between the end frame members. The upper portion of the machine includes a formed cover 9 hinged to lift upwardly and swing rearwardly to permit accessibility to a pair of tenderizing rolls 10 located beneath the cover 9. The hinged cover is provided with a chute 11 into which meat to be tenderized is dropped.

A motor 12 is resiliently mounted on the motor base 1 and drives a pinion 13 mounted on a shaft 14 journaled in a boss formed on the end frame 3. The shaft 14 is connected to the motor shaft by means of a universal joint 15. The pinion 13 is meshed with a bull gear 16 which is mounted on and keyed to the hub of a pinion 17. The pinion 17 is rotatably journaled on a shaft 18 which is mounted in a boss on the end frame 3 of the machine. The pinion 17 meshes with the larger of a pair of gears 19 and 20 which are keyed together and rotatably mounted upon a jackshaft 21 fixedly studded in a boss formed on the end frame. The gear 20 is meshed with one of a pair of intermeshed driving gears 22. The driving gears 22 are keyed on the outer ends of a pair of drive arbors 23 which are rotatably journaled in sleeve bearings 24 in turn mounted in a pair of bosses on the end frame 3. At their innermost ends, the arbors 23 are provided with longitudinally extending flattened transverse tenons 32.

The end frame member 2 has a pair of bosses 25 formed near its upper forward end, the bosses being substantially coaxial with the drive arbors 23 when the end frames 2 and 3 are assembled on the motor base 1. A journal 26 is slidably mounted on each of the bosses 25, and has at its inner end a turned down portion or cylindrical tenon 35.

The tenderizing rolls 10 are mounted between the drive arbors 23 and the journals 26 and are coaxial therewith. Each of the tenderizing rolls comprises a plurality of thin disk-shaped cutting-knives 27 which are keyed to a shaft 28. The knives 27 of each roll are alternately spaced by means of spacing collars 29 as shown in Figures II and III. A nut 30 is fastened at one end of each of the shafts 28 to secure the cutting-knives 27 and the collars 29 on the shafts.

On the left end of each of the shafts 28, as viewed from the operator's stance, there are milled two triangular projections 31 which correspond to and cooperate with the flattened tenons 32 of the drive arbors 23. Enclosing the milled end of each of the shafts 28 and extending beyond the projections 31 is a knurled sleeve or collar 33 which acts to guide the tenons 32 of the drive arbors 23 into engagement with the projections 31 and maintain the drive arbors and arbor shafts in correct axial alignment. It will be noticed that the collars 33 and the nuts 30 for securing the cutting-knives on the shafts are of different lengths in order that the knives of the two rolls will be in staggered planes to facilitate intermeshing.

The end of each of the shafts 23 opposite the end having the projections is counterbored and carries a sleeve bearing 34 in the counterbore into which the cylindrical tenon 35 of one of the journals 26 is insertable.

When the tenderizing rolls 10 are in their operable position, they are prevented from moving longitudinally by means for locking the journals 26 in their innermost position. The locking means comprises a plate 36 which is secured to and extends between the bosses 25 and which cooperates with notches 37 milled across the body of the journals 26. Flats 38 are also milled longitudinally for a short distance on each of the journals to permit the ends of the plate 36 to extend radially inwardly of the diameter of the journals. In Figure II, the forward journal 26 is shown in its locked position and the rear journal is shown in its unlocked position.

Referring now to Figure IV, the preferred form of the invention consists of the single flattened transverse longitudinally extending tenon 32 on each of the drive arbors 23 which is engageable with the pair of substantially triangular projections 31 and the collar 33 on each of the tenderizing rolls 10. The projections 31 extend longitudinally from the ends of the shafts 28 a distance substantially equal to the distance which the tenons 32 extend. The apexes of the projections are centrally directed and radially spaced a distance greater than the thickness of the tenons. The corresponding sides of the projections 31 are substantially parallel and lie in planes radially spaced a distance substantially equal to the thickness of the tenons 32.

The prime objective of the machine, as stated in the objects, is to provide driving means for tenderizing rolls which permit a wide range of misalignment of the driving member and the driven member during assembly. The use of the flat transverse tenon 32 cooperating with only two triangular radially spaced projections 31, both surrounded by the collar 33, accomplishes this purpose.

Assuming that the tenderizing rolls 10 have been cleaned and are ready for replacement in the machine, the replacement takes place as follows. (The hinged cover 9 has been raised during disassembly and the journals 26 have been moved to the right and are unlocked.) The rolls are held in the operator's left hand just as they will finally fit into the machine. The collars 33 on the ends of the shafts 28 are slipped over the tenons 32 and the tenderizing rolls 10 are then moved to the left. In most instances, the tenons on the drive arbor and the projections on the shaft will mesh correctly. When the tenons and projections do not mesh they can be engaged after rotating the tenderizing rolls somewhat, never more than 45°. Such rotation is easily accomplished by bending the wrist. After the tenons 32 and projections 31 have been engaged, the knurled journals 26 are moved to the left to engage their cylindrical tenons 35 in the counterbores of the arbor shafts. When this has been done, the operator no longer need hold the tenderizing rolls. Finally the journals are locked in position by a slight rotation which engages the edges of the plate 36 in the notches 37, and the hinged cover is pulled down to ready the machine for subsequent tenderizing of meat.

Various other changes may be made in the details of construction and in the combination and arrangement of the several parts within the scope of the claims without departing from the spirit of this invention.

What is claimed is:

1. In a meat tenderizing machine, in combination, a drive shaft, a cutter shaft having a plurality of thin disklike knives keyed thereto, a disconnectable driving connection between said shafts, said disconnectable driving connection comprising a collar carried by one of said shafts and projecting beyond an end thereof to function as a socket for receiving an end of the other of said shafts and for maintaining said shafts in axial alinement, a single flattened tenon protruding longitudinally from the end of one of said shafts and a pair of triangular projections protruding from the end of the other of said shafts, said projections being radially spaced apart a distance substantially greater than the thickness of said flattened tenon whereby said shafts may be moved relatively longitudinally to bring said tenon and said projections into interdigitated relationship within the socket formed by said collar notwithstanding that the shafts are in various relative angular positions, and means for holding said shafts against relative axial movement, said means being releasable to permit one of said shafts to be shifted longitudinally to disconnect said driving connection.

2. In a meat tenderizing machine, in combination, a pair of drive shafts, a pair of cutter shafts each having a plurality of thin disklike knives keyed thereto, disconnectable driving connections between said drive shafts and said cutter shafts, each such driving connection comprising a collar carried by one of said shafts and projecting beyond an end thereof to function as a socket for receiving an end of another of said shafts thus holding the connected drive shaft and cutter shaft in axial alinement, a single flattened tenon protruding longitudinally from the end of one of said shafts and a pair of projections protruding from the end of the other of said shafts, said projections being radially spaced apart a distance substantially greater than the thickness of said flattened tenon whereby said tenon and said projections may be moved into interdigitated relationship within the socket formed by said collar notwithstanding that said shafts are in various relative angular positions, and means for holding said shafts against relative axial movement, said means being releaseable to permit one of said shafts to be shifted longitudinally to disconnect such driving connection.

3. In a meat tenderizing machine, in combination, a drive shaft, a cutter shaft having a plurality of thin disklike knives keyed thereto and a disconnectable driving connection between said shafts, said disconnectable driving connection comprising a collar carried by one of said shafts and projecting beyond the end thereof to function as a socket for receiving the end of the other of said shafts thus holding said shafts in axial alinement, projections on the ends of said shafts which interdigitate when the ends of said shafts are moved toward each other within said socket, the angular spacing between said projections being sufficient to permit a substantial relative angular movement of said shafts when said projections are interdigitated and means for holding said shafts against relative axial movement, said means being releaseable to permit one of said shafts to be shifted longitudinally to disconnect said driving connection.

References Cited in the file of this patent

UNITED STATES PATENTS

| Number | Name | Date |
|---|---|---|
| 2,058,695 | Jungholm | Oct. 27, 1936 |
| 2,409,463 | Ahrndt | Oct. 15, 1946 |

FOREIGN PATENTS

| Number | Country | Date |
|---|---|---|
| 406,934 | Germany | Dec. 4, 1924 |